United States Patent [19]

Digney et al.

[11] 3,896,027

[45] July 22, 1975

[54] METHOD OF TREATING SEWAGE TO ENHANCE AEROBIC DECOMPOSITION

[76] Inventors: Kenneth A. Digney, Woodchuck Hill Rd., Fayetteville, N.Y. 13066; Alfred P. Gallauresi, 112 Wycliffe Rd., Solvay, N.Y. 13209

[22] Filed: Mar. 19, 1974

[21] Appl. No.: 452,602

Related U.S. Application Data

[63] Continuation-in-part of Ser. No. 372,776, June 22, 1973.

[52] U.S. Cl. .................................. 210/14; 210/15
[51] Int. Cl. ............................................ C02c 1/12
[58] Field of Search ....... 210/14, 15, 170, 220, 221, 210/63, 152; 261/87, 91, 93, 121 M

[56] References Cited
UNITED STATES PATENTS

| | | | |
|---|---|---|---|
| 1,374,446 | 4/1921 | Greenwalt | 261/87 |
| 1,526,596 | 2/1925 | Greenwalt | 261/87 X |
| 2,987,186 | 6/1961 | Burgoon et al. | 210/14 X |
| 3,206,176 | 9/1965 | Peterson | 210/14 X |
| 3,207,313 | 9/1965 | Schulze | 261/87 X |
| 3,414,245 | 12/1968 | Frazer | 261/87 |

FOREIGN PATENTS OR APPLICATIONS
218,637  4/1942  Switzerland.......................... 261/87

*Primary Examiner*—John Adee
*Assistant Examiner*—Robert H. Spitzer
*Attorney, Agent, or Firm*—Charles S. McGuire

[57] ABSTRACT

A method for increasing the level of air or other gas entrained or dissolved in a liquid. The principal application is to enhance aerobic decomposition in sewage by recirculation through a pump wherein a high level of dissolved oxygen is maintained by mixing atmospheric air into the sewage as it passes through the pump. A hollow shaft, which may conveniently comprise the pump impeller drive shaft, extends from an air intake opening above the sewage level to communicate with the hollow interior of the impeller blades. The air is discharged through openings preferably at or near the tips of the blades, thereby entering the stream of sewage passing through the pump at the point of highest velocity. Oxygen in the air is ultimately mixed and retained in the sewage to stimulate bacterial activity.

6 Claims, 3 Drawing Figures

METHOD OF TREATING SEWAGE TO ENHANCE AEROBIC DECOMPOSITION

REFERENCE TO RELATED APPLICATION

This is a continuation-in-part of U.S. application Ser. No. 372,776, of the same inventors, filed June 22, 1973.

BACKGROUND OF THE INVENTION

The present invention relates to methods for increasing the amount of dissolved gases in liquids, and more specifically to methods designed to mix oxygen with liquid sewage through pumping action.

As explained at length in the aforementioned copending application, the action of aerobic bacteria is essential to conversion of sewage into an ecologically acceptable effluent. Thus, any sewage treatment means which promotes the presence and activity of these naturally occurring organisms is of major importance. It is generally recognized that aeration of sewage to increase the level of dissolved oxygen is one of the most effective means of stimulating bacterial cultivation. Many forms of sewage handling systems are specifically designed to add oxygen in various ways to the raw sewage in order to aid in its treatment by the action of aerobic bacteria. The invention disclosed and claimed in the aforementioned copending application is an example of such a system, and several other prior forms are also mentioned in said application.

It is a principal object of the present invention to provide sewage treatment apparatus for performing the method, said apparatus having improved structure for increasing the level of dissolved oxygen in the sewage, thereby stimulating growth of aerobic bacteria to aid in converting raw sewage to fresh sewage.

A further object is to provide apparatus to perform the method by increasing and retaining dissolved oxygen in sewage which is suitable in size and cost for use in relatively small volume applications, such as a single family residence.

Another object is to provide sewage treatment apparatus to perform the method and being incorporated with a domestic septic tank, or the like, wherein the complete volume of sewage is treated continuously to increase the level of dissolved oxygen through pumping action.

In a more general sense, the object is to provide methods for increasing the level of dissolved air oxygen in a liquid.

Other objects will in part be obvious and will in part appear hereinafter.

BRIEF SUMMARY

In accordance with the foregoing objects, the invention is disclosed in the context of a domestic type sewage system, namely, an enclosed septic tank of conventional design. A centrifugal pump is arranged with a liquid intake opening below the sewage level within the tank, and an outlet which may be either above or below sewage level, but which in any case discharges the sewage back into the tank. The pump impeller blades are powered by a motor, preferably located outside the tank or in a separate chamber thereof, connected to the blades, or to intermediate support structure, by a rotating shaft.

The pump blades extend in a helical path from the central shaft to their outer ends and are enclosed in a chamber having inlet and outlet openings. The blades are essentially hollow, having open ends at their tips communicating with a central opening in the shaft. The shaft opening extends axially through the shaft from an air intake opening above sewage level to the communicating opening with the hollow interiors of the blades.

The sewage is propelled through the pumping chamber by the centrifugal action of the blades, passing from the inner to the outer blade ends. As the sewage passes over the outer tips of the blades at a very high velocity, a stream of air is injected directly into the sewage due to lower pressure being formed as it passes over the blade openings at the tips. The blade movement itself also tends to expel by centrifugal force the air inside the hollow interior, and a fresh supply of air will be drawn in through the shaft air intake. Thus, the steady flow of air through the hollow drive shaft and impeller blades is intimately mixed with the sewage flowing through the pump to maintain a high level of dissolved oxygen, thereby stimulating aerobic bacterial action and insuring proper sewage treatment.

DESCRIPTION OF THE PREFERRED EMBODIMENT

Figure 1:
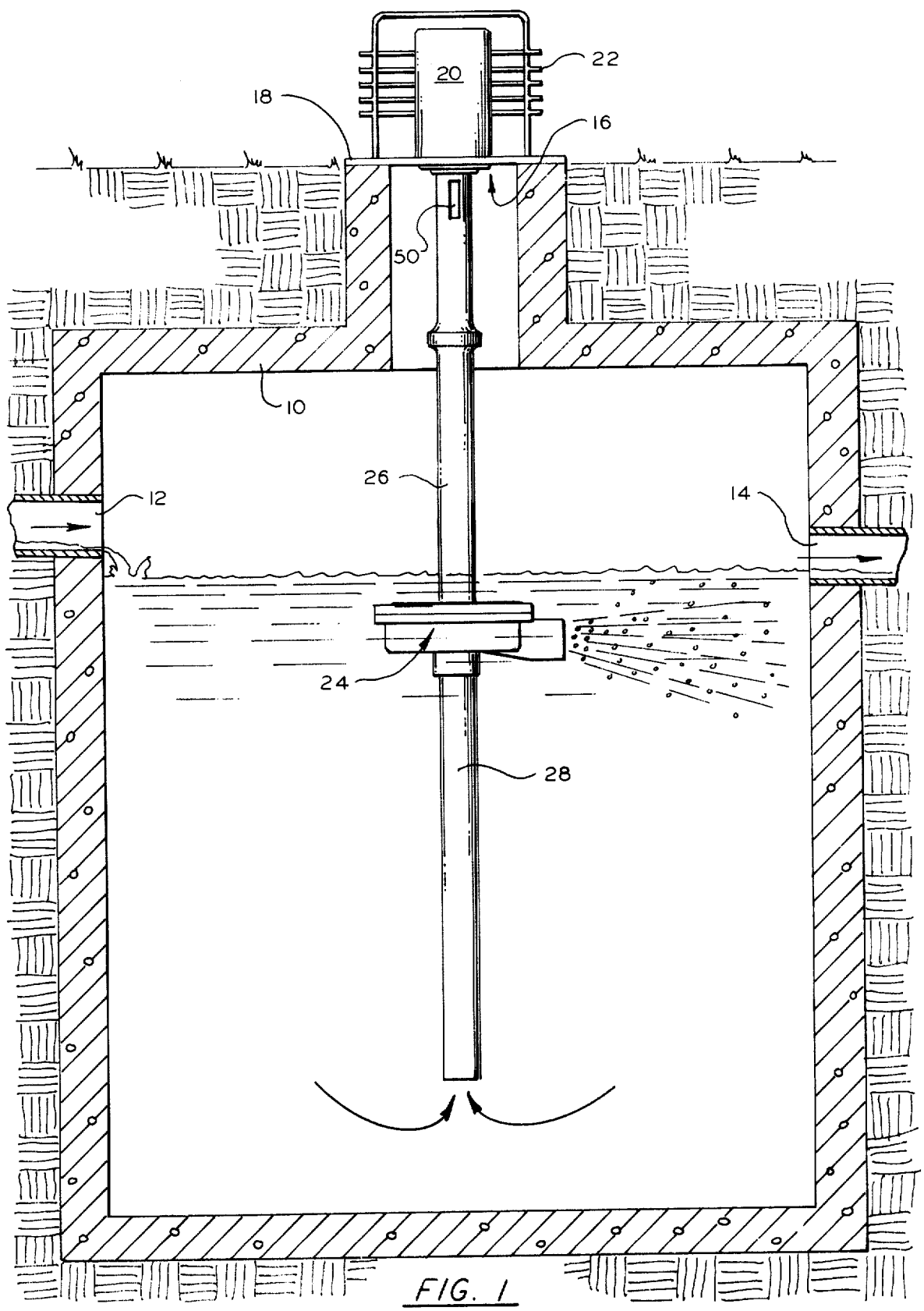
FIG. 1 is an elevational view of a typical sewage treatment installation embodying the present invention, partly in section.

A conventional septic tank 10 of concrete, metal, plastic, or other suitable material receives sewage through inlet 12 and discharges it through outlet 14 in a normal, gravity flow system. The sewage should be sufficiently biodecomposed when discharged through outlet 14 as to be harmless to the environment. This is insured by action of the recirculating aerobic pumping system described hereinafter, whereby the total volume of sewage is turned over many times each day, depending on the relative size of the tank and capacity of the pumping unit. Although the invention is illustrated in the context of a domestic-type septic tank, normally buried at some point exteriorly adjacent a residential or commercial building, it is to be understood that it may also be effectively employed in tanks located in basements or other interior locations.

Opening 16 in the top of tank 10 is covered by plate 18, although the plate is not in sealing engagement with the top of the tank, allowing communication between the upper interior of the tank and outside atmosphere. Motor drive 20 is supported on plate 18, either externally of tank 10, as shown, or internally so that there is no appreciable extension above ground level of any structure. Motor 20 is preferably a conventional electric motor of appropriate capacity, but may be a gasoline engine or other type drive means in applications where electrical power is not available. Being mounted externally of tank 10, motor 20 is removed from possible contact with the sewage or corrosive gases released during initial stages of the aerobic process. Motor 20 is preferably enclosed in a vented cover 22 of metal or plastic which may blend with and complement the area where it is located.

Pump unit 24 is suspended by hollow tube 26 from cover 18 or motor 20. Tube 26 may be provided in a single or a number of sections of cast or formed tubes, as shown, and serves to enclose the drive shaft operatively connecting motor 20 to pumping unit 24. The illustrated pumping unit is of the submerged type, and tube 26 is provided in sufficient length to support the unit below the sewage surface. This insures a positive pump prime at all times, as well as quiet operation, free from maintenance and seal leakage problems commonly associated with flexible element (rubber impeller) sewage pumps now in use. Tube 26 is preferably of bronze, aluminum, plastic, or similar non-corrosive material. Intake tube 28 extends from the pumping unit inlet to an intake opening near the bottom of tank 10, or whatever level of the tank is desired for complete recirculation of sewage volume.

Figure 2:
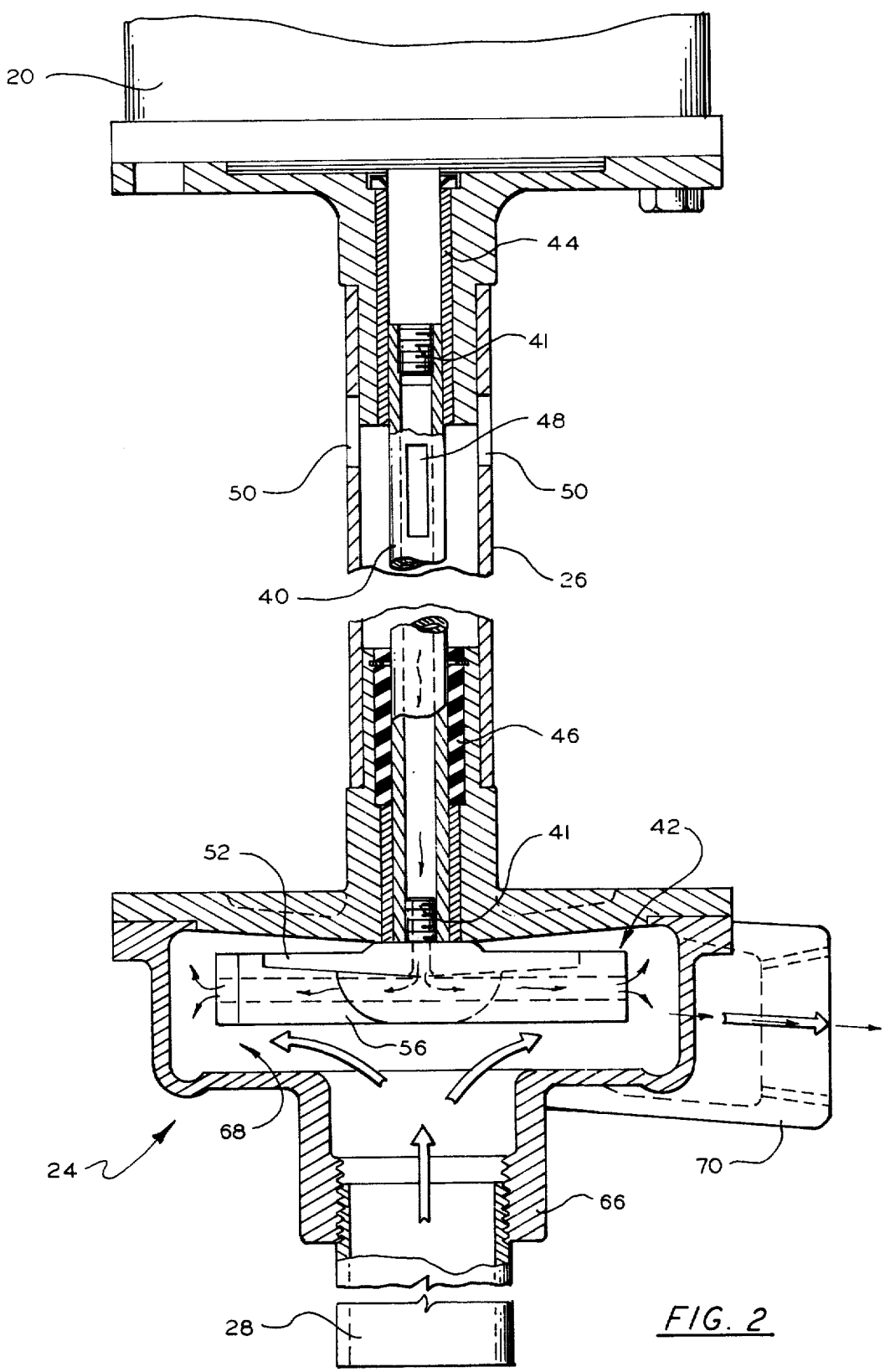
FIG. 2 is an elevational view, in vertical section, of major elements of the apparatus of FIG. 1.

Referring now to FIG. 2, drive shaft 40 is shown within tube 26 extending between threaded connections 41 with motor 20 and pump impeller 42. Support bearings 44 are provided at suitable intervals between the drive shaft and tube to prevent whipping of the shaft. Support bearings 44 can be of self lubricating carbon-graphite, leaded bronze or other bearing compositions capable of dry or wet running. True running of the pump impeller is insured by a conventional sleeve bearing of bronze, carbon or plastic composition or by a cutlass rubber bearing 46 ideally suited for this purpose because of its soft rubber composition and grooved interior whereby particles or small solids are rolled through and free of the bearing, thereby eliminating shaft wear and scouring.

Since non-dissolvable solids can be expected to be part of the sewage, the impeller 42 of the pump is designed with a maximum of non-clogging features. These include a minimum of pumping blades, usually two, of the open or closed impeller type with sufficient blade width or depth (i.e., the vertical dimension, as shown in FIG. 2) to handle the maximum size of solids in suspension, or an impeller of limited vertical dimension so as to induce a pumping action in the pump scroll and still not be in complete contact with the sewage being pumped. Besides generating the pumping action, the blades of the impeller serve as a macerator or chopper to reduce the original size of maceratable solids such as human fecal matter. This macerating action of the pump impeller, combined with the high velocity of the sewage through the rotating impeller, serve to mash, mangle or otherwise reduce, solids in suspension into more finely divided particles which accelerate and further support the aerobic biological action.

Figure 3:
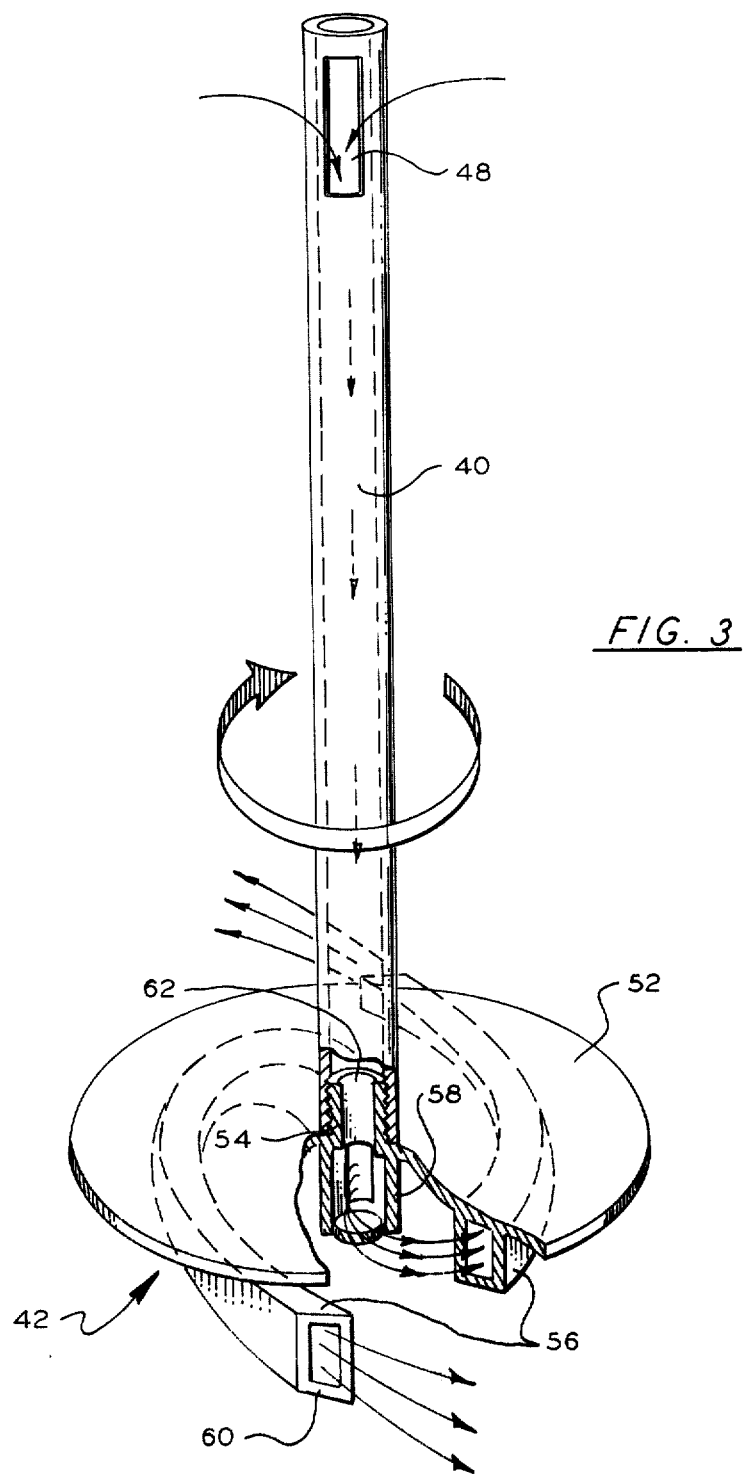
FIG. 3 is a perspective view, with portions broken away, of some of the elements shown in FIG. 2.

Shaft 40 constitutes a hollow tube, having an opening extending axially therethrough, and one or more openings such as that indicated in FIGS. 2 and 3 by reference numeral 48 extending through the wall at or near the upper end. Openings 50 are provided in the wall of hollow tube 26 adjacent opening 48, whereby the hollow interior of shaft 40 freely communicates with the outside atmosphere.

The structure of impeller 42 and its connection to shaft 40 are shown more clearly in FIG. 3. Impeller 42 may conveniently be cast in a single piece, and includes essentially flat plate 52 having upwardly extending stub shaft 54 and depending blades 56. Shaft 54 is externally threaded to mate with internal threads in shaft 40, providing the aforementioned connection 41. Other suitable connecting means, such as press fit, set screws, etc., may, of course, be used in place of the illustrated threaded connection. Blades 56 are essentially square or rectangular in cross section in the illustrated form, but may take other forms as long as sufficient cross sectional area is provided to insure the desired pumping action. The blades extend in a spiral path from a hollow central portion 58 to outer ends or tips 60.

Stub shaft 54 is hollow, opening 62 therein providing communication from the interior or shaft 40 to the interior of portion 58. Blades 56 are also hollow, communicating at their inner ends with the interior of central portion 58 through openings 64, and being open at tip ends 60. Thus, air may pass through openings 50 in tube 26, through openings 48 in shaft 40, downwardly through shaft 40 and stub shaft 54 into hollow central portion 58 of impeller 42, through the interiors of blades 56, and be expelled through the open tips.

Referring again to FIG. 2, intake tube 28 is threaded into flange 66 defining the inlet to cylindrical pumping chamber 68 of pumping unit 24. Sewage is pumped through chamber 68 by the centrifugal action of impeller 42, being discharged through pump outlet 70. As blades 56 rotate at a velocity of, for example, 3500 revolutions per minute, the air will be expelled by centrifugal force from the hollow interiors thereof, being replenished by a supply of atmospheric air through shaft 40, as indicated by the arrows. The air flow out of the open tips of the blades is discharged directly into the stream of sewage flowing through the pump, thereby mixing intimately with the sewage and increasing the level of dissolved oxygen with each pass through the pump. The entire volume of tank 10 may be recirculated through the pump several times a day, although it may not be necessary to operate the pump continuously to achieve the desired level of aerobic bacterial activity from the increased oxygen level induced thereby.

An inherent characteristic of centrifugal-type pumps of the form shown in FIG. 2 is conversion of the kinetic energy of the liquid moving at a high velocity through the pump housing to pressure energy. Thus, the pressure to which air injected through blades 56 is subjected within the pump housing is considerably above the atmospheric pressure at which it enters. The air will therefore be compressed to a fraction of its atmospheric volume, occupying less space per volumetric unit and allowing more air to be absorbed in the same volume of liquid. This increase in the content of air, and thus of oxygen, in the liquid sewage stimulates bacterial action for more efficient aerobic reduction thereof.

Although the tank is vented to the atmosphere and the liquid contents thereof are obviously not under pressure, the high content of air injected within the pump housing is not quickly dissipated when the liquid leaves the pump. This is also due to natural and well-understood effects of surface tension of the liquid and molecular cohesion of the gas. The continuing pumping action and injection of the air within the naturally pressurized pump housing, rather than the unpressurized, large tank volume, insures the retention of a high level of dissolved air in the liquid-gas mixture.

In the illustrated embodiment, pump unit 24 discharges directly into tank 10, below the liquid level thereof, and the tank is in the form of a single, enclosed chamber. Although this arrangement is the simplest, and therefore least costly, approach to practising the invention, and is entirely suitable for many applications, many further modifications are contemplated within the scope of the invention. For example, the pump outlet may be connected to a discharge tube extending above the level within tank 10, and discharge the sewage through a nozzle or against a splash plate in the form of a spray, as shown in applicants' earlier referenced application. However, care must be exercized to insure that an undesirable level of foaming does not result from such practise. Also, the various forms of multi-chamber flow of sewage through the tank disclosed in aforementioned application Ser. No. 372,776 may be employed in connection with the present invention. The sewage may be discharged back into the same chamber of tank 10 from which it enters the intake of the pump unit, or into a separate chamber from which it may recirculate back to the intake region. Chambers and baffles of various types may also be employed to increase the length of the flow path of sewage between inlet and outlet of tank 10, thereby increasing the retention and treatment time within the tank and/or the number of recirculations through the pump unit. Also, the tank may be inside a dwelling unit or other building, or outside, above or below ground level.

We claim:

1. A method of treating sewage to enhance aerobic decomposition thereof comprising:
   a. placing the sewage, substantially in a liquid state, into a container;
   b. pumping the sewage through an impeller pump having inlet and outlet openings both within the container;
   c. converting a portion of the velocity energy of the sewage passing through the pump to pressure energy; and
   d. mixing air into the sewage passing through said pump by ejecting air from an opening in at least one impeller blade of the pump.

2. The invention according to claim 1 wherein said pump is positioned below the liquid level in said container.

3. The invention according to claim 2 and further including rotating said impeller blade by a drive motor above the level of sewage connected to said blade by a drive shaft.

4. The invention according to claim 3 and further including supplying air to said impeller blade opening through the hollow interior of said drive shaft.

5. The invention according to claim 3 wherein said opening is so positioned and said impeller blade is rotated at such speed that air is ejected from said opening by centrifugal force as said blade is rotated.

6. The invention according to claim 1 and further including macerating solid materials in the sewage by the cooperative action of said blade and the pump housing within which the blade is positioned.

* * * * *